United States Patent [19]

Sasaki et al.

[11] Patent Number: 5,268,135
[45] Date of Patent: Dec. 7, 1993

[54] BIAXIAL ORIENTED POLYESTER FILM

[75] Inventors: Yasushi Sasaki, Tsuruga; Toshitake Suzuki, Ohtsu; Yutaka Baba, Tsuruga, all of Japan

[73] Assignees: Toyo Boseki Kabushiki Kaisha, Osaka; Nippon Magphane Co., Ltd., Tokyo, both of Japan

[21] Appl. No.: 861,944

[22] Filed: Apr. 2, 1992

[30] Foreign Application Priority Data

Apr. 5, 1991 [JP] Japan ............................... 3-101988

[51] Int. Cl.$^5$ ............................................. B29C 49/08
[52] U.S. Cl. ............................. 264/210.7; 264/288.4; 264/290.2; 528/272; 528/502; 528/503
[58] Field of Search ............... 264/210.7, 288.4, 290.2; 528/272, 502, 503

[56] References Cited

U.S. PATENT DOCUMENTS 4,876,137  10/1989  Utsumi ........................... 428/141
4,960,636  10/1990  Tomitaka et al. .................. 428/220

FOREIGN PATENT DOCUMENTS 0086302  11/1982  European Pat. Off. .
0356904  8/1989  European Pat. Off. .
1-168494  7/1989  Japan .

Primary Examiner—John Kight, III
Assistant Examiner—S. A. Acquah
Attorney, Agent, or Firm—Leydig, Voit & Mayer

[57] ABSTRACT

A biaxial oriented polyester film of the present invention has a density of 1.386 g/cm$^3$ or more. A sum Y of the coefficients of the heat shrinkage in the machine direction and in the transverse direction of the film at a temperature of 150° C. is 4.5% or more, and a sum X (kg/mm$^2$) of F$_5$ values in the machine direction and in the transverse direction of the film and the sum Y satisfy the following expression (I):

$$Y^2 + 3.2Y \geq 19.2X - 393.6 \qquad (I)$$

wherein the F$_5$ value refers to an applied force required for extending a film by 5%.

2 Claims, No Drawings

BIAXIAL ORIENTED POLYESTER FILM

BACKGROUND OF THE INVENTION

1. Field of the Invention

The present invention relates to a biaxial oriented polyester film, and more particularly to a biaxial oriented polyester film preferable as a base film for a magnetic tape.

2. Description of the Prior Art

A biaxial oriented polyester film has been used as a preferred magnetic recording material, especially as a base film material for a magnetic tape because of its excellent physical and chemical properties. In recent years, a film having a satisfactory abrasion resistance, more specifically, a film which does not generate abrasion powders during a calendering step in the course of the production of a magnetic tape, has been demanded along with a high speed process for producing the magnetic tape. The calendering comprises the step of smoothing the surface of a magnetic layer, the magnetic layer being obtained by coating a composition for a magnetic layer onto a polyester film, followed by drying. According to the calendering step, the polyester film passes between rollers onto which an extremely high pressure is applied, so that protrusions on the surface of the polyester film on which the magnetic layer is not formed are scraped off to generate abrasion powders.

As a method for preventing the scrapes, for example, a method in which a degree of crystallization of the base film is decreased is disclosed in Japanese Laid-Open Patent Publication No. 60-195727. However, according to this method, the following problem arises. When the base film on which the magnetic layer is formed is slitted into a predetermined width to be molded into a magnetic tape, edge damages (edge up and whisker) and powders are remarkably generated from a cutting section of the base film, resulting in a frequent dropout of the obtained magnetic tape.

SUMMARY OF THE INVENTION

The biaxial oriented polyester film of this invention, which overcomes the above-discussed and numerous other disadvantages and deficiencies of the prior art, has a density of 1.386 g/cm³ or more, which is shrinked by heating, wherein a sum Y of coefficients of heat shrinkage in a machine direction and in a transverse direction of the film at a temperature of 150° C. is 4.5% or more, and a sum X (kg/mm²) of $F_5$ values in a machine direction and in a transverse direction of the film and the sum Y satisfy the following expression (I):

$$Y^2 + 3.2Y \geq 19.2X - 393.6 \tag{I}$$

wherein the $F_5$ value refers to an applied force required for extending a film by 5%.

In a preferred embodiment, a coefficient of the heat shrinkage in the transverse direction of the film at a temperature of 105° C. is less than 0.5%, and a heat shrinkage rate in the machine direction of the film at a temperature of 70° C. is less than 0.03% per hour.

Thus, the invention described herein makes possible the objectives of (1) providing a film which is excellent in abrasion resistance, and more specifically, a film in which abrasion powders are hardly generated during the calendering step in the course of the production of the magnetic tape; and (2) providing a film in which edge damages and powders are hardly generated when the film is slitted and which is excellent in electromagnetic conversion property when used for a magnetic tape.

DESCRIPTION OF THE PREFERRED EMBODIMENTS

The biaxial oriented polyester film of the present invention comprises a polyester as its main component. This polyester is preferably a polyester comprising an aromatic dicarboxylic acid and a glycol as its raw materials. Examples of the aromatic dicarboxylic acid component include isophthalic acid, 2,6-naphthalenedicarboxylic acid, 4,4'-dicarboxydiphenyl, 4,4'-dicarboxybenzophenone, bis(4-carboxyphenyl)ethane, adipic acid, sebacic acid, 5-sodium sulfoisophthalate, and cyclohexane-1,4-dicarboxylic acid. Examples of the glycol component include propylene glycol, butanediol, neopentyl glycol, diethylene glycol, cyclohexanedimethanol, ethylene oxide adducts of bisphenol A, polyethylene glycol, polypropylene glycol, and polytetramethylene glycol. In addition to these, hydroxycarboxylic acid components such as p-hydroxybenzoic acid can be used. Moreover, as other copolymer components, a compound having a small number of amide bonds, urethane bonds, ether bonds, or carbonate bonds can be contained. It is particularly preferred that 95 mol % or more repeating units of the polyester is ethyleneterephthalate or ethylene-2,6-naphthalate. The polyester can be used alone or in combination of two or more kinds thereof.

As a method for producing such a polyester, any production methods including a direct polymerization method in which an aromatic dicarboxylic acid is directly reacted with a glycol, and a transesterification method in which a dimethylester of an aromatic dicarboxylic acid and a glycol are subjected to transesterification can be used.

The biaxial oriented polyester film of the present invention may comprise inactive particles. The polyester film can be provided with protrusions on its surface by comprising inactive particles and excellent slipperiness. The inactive particles may be inorganic or organic particles. Examples of materials for the inorganic inactive particles include carbonate of Ca, Mg, Sr or Ba; sulfate of Na, K, Mg, Ca, Ba or Al; phosphate of Na, K, Mg, Ca, Sr, Ba, Al, Ti or Zr; silicon dioxide; alumina; amorphous or crystalline clay minerals; composite silicic acid compounds such as aluminosilicate compounds; asbestos such as zircon and fly ash; oxide of Zr or Ti; terephthalate of Ca, Ba, Zn or Mn; chromate of Ba or Pb; carbon such as carbon black and graphite; glass such as glass powders and glass beads; fluorite; and ZnS. Among them, for example, calcium carbonate, silicic acid anhydride, silicic acid hydrate, aluminium oxide, aluminium silicate, barium sulfate, calcium phosphate, zirconium phosphate, titanium oxide, lithium benzoate, glass powders, clays (kaolin, bentonite, China clay, etc.), talc, and diatomaceous earth are preferred. Examples of materials for the organic inactive particles include cross-linked polystyrene resin, cross-linked acrylic resin, benzoguanamine resin, silicone resin, and cross-linked polyester resin. These inactive particles can be natural or synthetic, or can be used in a composite salt form. Moreover, these inactive particles can be used alone or in combination of two or more kinds thereof.

The average particle size of the above-mentioned inactive particles is preferably in the range of 0.05 to 5.0 μm, and more preferably, in the range of 0.1 to 2.5 μm. The content of the inactive particles is preferably in the range of 0.05 to 4.0 parts by weight based on 100 parts by weight of polyester, and more preferably, in the range of 0.05 to 2.0 parts by weight.

The biaxial oriented polyester film of the present invention is required to have a density of 0.386 g/cm³ or more, preferably 1.388 g/cm³ or more, and most preferably 1.390 g/cm³ or more. When the density of the film is less than 1.386 g/cm³, the abrasion resistance of the film is improved and the amount of abrasion powders generated from the film during the calendering step is decreased. However, in this case, the degree of crystallization of the film becomes small, and edge damages and powders are generated in the slitting step of the film; as a result, when such a polyester film is used as a magnetic tape, dropout is likely to occur.

In the biaxial oriented polyester film of the present invention, it is required that a sum Y of coefficients of heat shrinkage in a machine direction and in a transverse direction of the film at a temperature of 150° C. is 4.5% or more; and a sum X (kg/mm²) of $F_5$ values in a machine direction and in a transverse direction of the film and the sum Y satisfy the expression (I).

$$Y^2 + 3.2Y \geq 19.2X - 393.6 \quad (I)$$

Herein, the $F_5$ value refers to an applied force required for extending a film by 5%. Moreover, a machine direction of film refers to a longitudinal direction, and a transverse direction of a film refers to a direction crossing the longitudinal direction. In general, there is a correlation between the $F_5$ value and the coefficient of the heat shrinkage. As the $F_5$ value increases, the coefficient of the heat shrinkage is likely to increase. However, the $F_5$ value does not necessarily correspond to the coefficient of the heat shrinkage one to one. Depending upon the production method of the film, the above relationship can be satisfied. When the biaxial oriented polyester film of the present invention satisfies the above relationship, the abrasion resistance of the film becomes satisfactory, whereby the generation of the abrasion powders from the film during the calendering step can be prevented. When the sum Y of the coefficient of the heat shrinkage in the machine direction and in the transverse direction of the film at a temperature of 150° C. is less than 4.5%, even though the sum Y satisfies the relationship with the sum X of the $F_5$ values in the machine direction and in the transverse direction of the film, a film excellent in abrasion resistance cannot be obtained. Here, the coefficient of the heat shrinkage at a temperature of 150° C. can be greater in the machine direction or in the transverse direction, or can be almost the same in both directions. Only when the sum Y is 4.5% or more and satisfies the above relationship, the abrasion resistance of the film becomes satisfactory.

In contrast, even though the coefficient of the heat shrinkage is greater only in one direction, when the sum Y does not satisfy the above relationship, the abrasion resistance of the film cannot be improved. Moreover, the $F_5$ values in the machine direction and in the transverse direction of the film can be set in accordance with the kinds of magnetic tape without any special limit. However, in the case where the $F_5$ values in the machine direction and in the transverse direction of the film are extremely small, since a head-touch onto the magnetic tape becomes unsatisfactory, it is preferred that both of the $F_5$ values in the machine direction and in the transverse direction of the film are 10.5 kg/mm² or more. In contrast, in the case where the $F_5$ values in the machine direction and in the transverse direction of the film are extremely great, when an unextended film is extended, a void is generated on the interface between the polyester and the particles which are to be added to the polyester. As a result, the abrasion resistance becomes unsatisfactory, and abrasion powders are generated from the film during the calendering step. Thus, it is preferred that the sum X of the $F_5$ values in the machine direction and in the transverse direction of the film be 30 kg/mm² or less.

As to the biaxial oriented polyester film of the present invention, a coefficient of the heat shrinkage in the transverse direction of the film at a temperature of 105° C. is preferably less than 0.5%. In the case where the coefficient of the heat shrinkage in the transverse direction of the film at a temperature of 105° C. is 0.5% or more, when the film is used for a magnetic tape, the heat shrinkage in the transverse direction of the film during the production of the magnetic tape becomes remarkable, resulting in poor productivity. In general, when the coefficient of the heat shrinkage of the film at a temperature of 150° C. is increased, the coefficient of the heat shrinkage at a temperature of 105° C. is likely to be increased. Even thought the coefficient of the heat shrinkage at a temperature of 105° C. is increased, the coefficient of the heat shrinkage at a temperature of 105° C. can be decreased by appropriately selecting the production method of the film.

As to the biaxial oriented polyester film of the present invention, it is preferred that a heat shrinkage rate in the machine direction of the film at a temperature of 70° C. is less than 0.03% per hour. In the case where the heat shrinkage rate in the machine direction of the film is 0.03% or more per hour, when the film is used for a magnetic tape, a skew property of the magnetic tape is likely to be degraded.

As a method for producing the biaxial oriented polyester film of the present invention, any methods can be adopted without any special limit. For example, the following method can be used.

First, organic or inorganic particles are added to a polyester for the purpose of forming protrusions on the surface of the film. This polyester film is made of an amorphous film by the conventional known method, for example, extrusion by melting or casting by melting. Then, this amorphous film is biaxially extended in the machine and transverse directions, for example, by using the difference in speed between the low speed roller and the high speed roller. The machine and transverse extensions can be conducted in this order or at the same time. In addition, the extensions comprising three steps or more, in which the transverse extension, the machine extension, and the simultaneous biaxial extension are appropriately combined, can be conducted. After the polyester film is biaxially extended, the film is annealed in a tenter. In order to obtain a film having a density of 1.386 g/cm³ or more, it is preferred that the annealing be conducted at a temperature in the range of 190° to 230° C. for 2 to 10 seconds. Moreover, in order to obtain the sum Y of 4.5% or more of the coefficients of the heat shrinkage in the machine direction and in the transverse direction of the film at a temperature of 150° C., it is preferred that the film be re-extended by 2 to 30% in the transverse direction or in both directions at the same time of the annealing.

After the annealing, the film can be subjected to relaxation in the transverse and machine directions. The relaxation in the transverse direction is preferably conducted in the tenter. In order to decrease the coefficients of the heat shrinkage in the transverse direction of the film at a temperature of 105° C. while maintaining the coefficients of the heat shrinkage in the transverse direction of the film at a great value at a temperature of 150° C., it is effective that the relaxation temperature is made in the range of 130° to 170° C. The relaxation rate is preferably adjusted in the range of 0.05 to 20%, and more preferably, in the range of 0.2 to 10% so as to obtain a desired coefficient of the heat shrinkage in the transverse direction.

The relaxation in the machine direction can be conducted in the tenter together with that in the transverse direction. The relaxation is preferably conducted by the use of a heated roller. In order to decrease the heat shrinkage rate in the machine direction of the film at a temperature of 70° C., the relaxation in the machine direction is preferably conducted at a temperature in the range of 80° C. to 150° C. The relaxation rate is preferably adjusted in the range of 0.05 to 5%, and more preferably, in the range of 0.1 to 1% by controlling the tension between the heating roller and rollers disposed in front and in the rear thereof.

The biaxial polyester film of the present invention has a density of 1.386 g/cm$^3$ or more, so that edge damages and powders are not generated during the slitting step. Moreover, according to the present invention, the sum Y of the coefficients of the heat shrinkage in the machine direction and in the transverse direction of the film at a temperature of 150° C. is 4.5% or more; and the sum X of the $F_5$ values in the machine direction and in the transverse direction of the film and the sum Y satisfy the expression (I) above, so that the film obtained is excellent in abrasion resistance, and therefore, abrasion powders are not generated during the calendering step. Furthermore, since the range of the sum X, which has an effect on the initial step for producing the tape, depends on the sum Y, it is possible to obtain a film capable of being used for a magnetic tape which is required to have various $F_5$ values by specifying the sum Y. Herein, the sum Y refers to a degree of molecular orientation of a polyester. When the degree of molecular orientation of the polyester is increased, brittleness of the polyester molecule is decreased. In contrast, when the degree of molecular orientation of the polyester is decreased, brittleness of the polyester molecule is increased. Accordingly, the brittleness of the biaxial oriented polyester film of the present invention is decreased by increasing the sum Y, resulting in satisfactory abrasion resistance.

EXAMPLES

An exemplary method for measuring the characteristics of the biaxial oriented polyester film obtained in the Examples and Comparative Examples described below is as follows:

(1) Coefficient of the heat shrinkage of the film

A film was cut in the machine and transverse directions to obtain test strips each having a width of 10 mm and a length of 100 mm. These test strips were allowed to stand without any applied tension in a gear oven maintained at a temperature of 150° C. or 105° C. The test strips were taken out of the gear oven 30 minutes later, and the coefficient of the heat shrinkage was calculated by comparing the length of the test strips before and after the treatment.

(2) $F_5$ value of the film

The same test strips as used in the measurement of the coefficient of the heat shrinkage were extended by using a Tensiron (manufactured by Orientec) at a flow speed of 100%/min. to obtain an applied force at the time when the film was extended by 5%.

(3) Heat shrinkage rate of the film at a temperature of 70° C.

A film was cut in the machine direction to obtain a test strip having a width of 4 mm and a length of 50 mm. The test strip was heated under a constant load of 9.4 g by using a thermal tester (TM-3000, manufactured by Shinku Riko). After the atmosphere of the test strip reached 70° C. (for example, after about 30 minutes), a shrinkage amount generated over 1 hour at this temperature was determined as the heat shrinkage rate.

(4) Abrasion resistance of the film during calendering

A film having a width of 30 cm was treated throughout the length of 40,000 m in a four-tiered super calender (linear pressure: 300 kg/cm, running speed: 300 m/min.). The amount of abrasion powders adhered to an elastic roller was visually observed and was ranked as follows:

1 ... No abrasion powders were observed.
2 ... An extremely small amount of abrasion powders were observed.
3 ... A small amount of abrasion powders were observed.
4 ... A great amount of abrasion powders were observed.

(5) Slit property of the film

A magnetic layer coating solution comprising the following components was coated onto the film obtained in the Examples and Comparative Examples and dried so that the thickness after being dried became 5 μm. The film was treated by a super calender, followed by curing. The film thus obtained was slitted into a width of ½ inch, thereby producing a VHS video tape.

COMPONENTS

1) Magnetic powders ($\gamma$-$Fe_2O_3$)
2) Binder (polyurethane/nitrocellulose)
3) Hardener (trifunctional isocyanate)
4) Carbon black
5) Abrasive material (alumina)
6) Lubricant (stearic acid/isobutyl stearate)
7) Solvent (methyl ethyl ketone/toluene/cyclohexane)

Edge damages on the facet of the slit were visually observed to rank as follows:

◯ ... Almost no edge damages were observed.
△ ... Edge damages were readily observed.
✕ ... A great amount of edge damages were observed.

EXAMPLE 1

A polyethylene terephthalate which contains 0.25% by weight of calcium carbonate having an average particle size of 0.5 μm and which has a limiting viscosity of 0.62 was prepared by the ordinary method.

The polyester thus obtained was dried and then molten at a temperature of 290° C., followed by being casted onto a cooling drum to obtain an amorphous polyester film having a thickness of 220 μm. Then, the film was heated using a roller heated to a temperature of 75° C. and an infrared heater having a surface temperature of 600° C. (positioned 20 mm away from the film). Then, the film is brought into contact with a low speed roller and a high speed roller. The difference in speed between the low speed roller and the high speed roller is controlled to regulate the tension of the film. Thus, the heated film was extended 3.3-fold in the machine direction. Furthermore, the film was guided into a tenter so as to come into contact with a low speed roller and a high speed roller. The difference in speed between the low speed roller and the high speed roller is controlled to regulate the tension of the film. Thus, the film was extended 4.4-fold in the transverse direction at a temperature of 100° C. In the tenter, after the film was extended in the transverse direction, it was annealed, re-extended in the transverse direction, and relaxed in the transverse direction. The annealing and the relaxation in the transverse direction were conducted under the conditions shown in Table 1. Then, the film was brought into contact with a roller heated to a temperature of 120° C. The difference in speed between the heating roller and the rollers disposed in front and in the rear thereof was controlled to regulate the tension of the film, thereby relaxing the film in the machine direction (machine relaxation rate: 0.2%) to obtain a biaxial oriented polyester film having a thickness of 15 μm.

EXAMPLE 2

A biaxial oriented polyester film was prepared in the same way as in Example 1, except that the film was re-extended in both machine and transverse directions while annealing, and the annealing, the re-extension in the machine and transverse directions, and the relaxation in the machine and transverse directions were conducted under the conditions shown in Table 1.

EXAMPLES 3 AND 4

A biaxial oriented polyester film was prepared in the same way as in Example 1, except that the transverse extension and machine extension were conducted in this order, and the annealing, the re-extension in the transverse direction, and the relaxation in the machine and transverse directions were conducted under the conditions shown in Table 1.

EXAMPLE 5

A biaxial oriented polyester film was prepared in the same way as in Example 1, except that a polyethylene terephthalate to which 0.25% by weight of kaolinite particles having an average particle size of 0.3 μm and 0.1% by weight of calcium carbonate having an average particle size of 0.5 μm were added instead of 0.25% by weight of calcium carbonate having an average particle size of 0.5 μm was used.

EXAMPLE 6

A biaxial oriented polyester film was prepared in the same way as in Example 1, except that a polyethylene terephthalate to which 0.2% by weight of spherical silica particles having an average particle size of 0.4 μm was added instead of 0.25% by weight of calcium carbonate having an average particle size of 0.5 μm was used.

COMPARATIVE EXAMPLES 1 AND 2

A biaxial oriented polyester film was prepared in the same way as in Example 1, except that the re-extension was not conducted while annealing, and the annealing and the relaxation in the machine and transverse directions were conducted under the conditions shown in Table 1.

COMPARATIVE EXAMPLE 3

A biaxial oriented polyester film was prepared in the same way as in Example 1, except that the re-extension was not conducted while annealing, the annealing and the relaxation in the transverse direction were conducted under the conditions shown in Table 1, and the relaxation in the machine direction was not conducted.

COMPARATIVE EXAMPLE 4

A biaxial oriented polyester film was prepared in the same way as in Example 4, except that the re-extension was not conducted while annealing, the annealing and the relaxation in the transverse direction were conducted under the conditions shown in Table 1, and the relaxation in the machine direction was not conducted.

The characteristics of the biaxial oriented polyester film obtained in Examples 1 to 6 and Comparative Examples 1 to 4 were examined. The results are shown in Table 2.

TABLE 1

| | Condition of extention | | | Condition of annealing | | | Condition of relaxation | | | |
| | | | | | | | TD | | MD | |
| | Order of extention | Magnification MD | TD | Temperature (°C.) | Re-extention (%) TD | MD | Temperature (°C.) | relaxation rate (%) | Temperature (°C.) | relaxation rate (%) |
|---|---|---|---|---|---|---|---|---|---|---|
| Example 1 | MD · TD | 3.3 | 4.4 | 200 | 10 | — | 150 | 5 | 120 | 0.2 |
| Example 2 | MD · TD | 3.3 | 4.4 | 205 | 5 | 5 | 160 | 3 | 120 | 0.2 |
| Example 3 | TD · MD | 3.6 | 3.6 | 210 | 5 | — | 150 | 3 | 120 | 0.2 |
| Example 4 | TD · MD | 4.2 | 3.8 | 200 | 20 | — | 150 | 6 | 120 | 0.2 |
| Example 5 | MD · TD | 3.3 | 4.4 | 200 | 10 | — | 150 | 5 | 120 | 0.2 |
| Example 6 | MD · TD | 3.3 | 4.4 | 200 | 10 | — | 150 | 5 | 120 | 0.2 |
| Comparative Example 1 | MD · TD | 3.3 | 4.4 | 200 | — | — | 200 | 6 | 120 | 0.2 |
| Comparative Example 2 | MD · TD | 3.3 | 4.4 | 180 | — | — | 180 | 7 | 120 | 0.2 |
| Comparative Example 3 | MD · TD | 3.3 | 4.4 | 220 | — | — | 220 | 4 | — | — |
| Comparative Example 4 | TD · MD | 4.2 | 3.8 | 210 | — | — | 210 | 5 | — | — |

MD: Machine direction
TD: Transverse direction

TABLE 2

| | | Physical property of Film | | | | | | | | |
|---|---|---|---|---|---|---|---|---|---|---|
| | | Coefficient of heat shrinkage at 150° C. | | | Coefficient of heat shrinkage at 105° C. | $F_s$ value (kg/mm$^2$) | | | heat shrinkage rate at 70° C. | | |
| | Density (g/cm$^3$) | MD (%) | TD (%) | MD + TD (%) | TD (%) | MD (%) | TD (%) | MD + TD (%) | MD (%/hr.) | Slit property | Calender scrape |
|---|---|---|---|---|---|---|---|---|---|---|---|
| Example 1 | 1.391 | 4.1 | 3.8 | 7.9 | 0.1 | 11.7 | 12.2 | 23.9 | 0.005 | ○ | 1 |
| Example 2 | 1.392 | 6.3 | 4.0 | 10.3 | 0.3 | 13.0 | 12.5 | 25.5 | 0.017 | ○ | 1 |
| Example 3 | 1.394 | 2.2 | 3.6 | 5.8 | 0.3 | 11.4 | 11.0 | 22.4 | 0.012 | ○ | 2 |
| Example 4 | 1.392 | 4.3 | 5.2 | 9.5 | 0.4 | 12.3 | 14.1 | 26.4 | 0.024 | ○ | 1 |
| Example 5 | 1.392 | 4.1 | 3.7 | 7.8 | 0.1 | 11.7 | 12.1 | 23.7 | 0.005 | ○ | 2 |
| Example 6 | 1.391 | 4.2 | 3.8 | 8.0 | 0.3 | 11.7 | 12.1 | 23.8 | 0.005 | ○ | 1 |
| Comparative Example 1 | 1.392 | 2.5 | 1.8 | 4.3 | 0.5 | 11.0 | 10.8 | 21.8 | 0.007 | ○ | 3 |
| Comparative Example 2 | 1.384 | 5.5 | 2.0 | 7.5 | 0.7 | 12.1 | 11.3 | 23.4 | 0.024 | x | 1 |
| Comparative Example 3 | 1.398 | 1.5 | −0.3 | 1.2 | −0.2 | 11.0 | 10.0 | 21.0 | 0.030 | ○ | 4 |
| Comparative Example 4 | 1.393 | 4.5 | 0.8 | 5.3 | 0.4 | 17.2 | 10.4 | 27.6 | 0.049 | ○ | 3 |

MD: Machine direction
TD: Transverse direction

As is apparent from Table 2, in the biaxial oriented polyester films obtained in Examples 1 to 6, abrasion powders were not generated during the calendering step, and edge damages were not generated during the slitting step. However, since the sum Y of the coefficients of the heat shrinkage in the machine direction and in the transverse direction of the film at a temperature of 150° C. was less than 4.5 in the biaxial oriented polyester films obtained in Comparative Examples 1 and 3, and because the relationship between the X and the Y did not satisfy the expression (I) in the biaxial oriented polyester film obtained in Comparative Example 4, abrasion powders were generated during the calendering step. Since the density was less than 1.386 g/cm$^3$ in the biaxial oriented polyester film in Comparative Example 2, edge damages were generated during the slitting step.

As is described above, the biaxial oriented polyester film of the present invention is excellent in abrasion resistance, so that abrasion powders are not generated during the calendering step and edge damages are not generated during the slitting step. Thus, the film obtained according to the present invention preferably can be used for wrapping or other industrial purposes, and particularly as a base film for a magnetic tape.

It is understood that various other modifications will be apparent to and can be readily made by those skilled in the art without departing from the scope and spirit of this invention. Accordingly, it is not intended that the scope of the claims appended hereto be limited to description as set forth herein, but rather that the claims be construed as encompassing one or more of the features of patentable novelty that reside in the present invention, including all features that would be treated as equivalents thereof by those skilled in the art to which this invention pertains.

What is claimed is:

1. A biaxial oriented polyester film having a density of 1.390 g/cm$^3$ or more, which is shrunk by heating, wherein a sum Y of coefficients of heat shrinkage in a machine direction and in a transverse direction of the film at a temperature of 150° C. is 4.5% or more, and a sum X (kg/mm$^2$) of $F_5$ values in a machine direction and in a transverse direction of the film and the sum Y satisfy the following formula (I):

$$Y^2 + 3.2Y \geq 19.2X - 393.6 \tag{I},$$

wherein the $F_5$ value refers to an applied force required for extending a film by 5%.

2. A biaxial oriented polyester film according to claim 1, wherein a coefficient of the heat shrinkage in the transverse direction of the film at a temperature of 105° C. is less than 0.5%, and a heat shrinkage rate in the machine direction of the film at a temperature of 70° C. is less than 0.03% per hour.

* * * * *

UNITED STATES PATENT AND TRADEMARK OFFICE
CERTIFICATE OF CORRECTION

PATENT NO. : 5,268,135
DATED : December 7, 1993
INVENTOR(S) : YASUSHI SASAKI, TOSHITAKE SUZUKI AND YUTAKA BABA It is certified that error appears in the above-identified patent and that said Letters Patent is hereby corrected as shown below:

ON THE TITLE PAGE:

item [56] References Cited
FOREIGN PATENT DOCUMENTS
Insert "60-195727 10/1985 Japan" in the appropriate sequence.

Column 4, line 27, delete "thought" and substitute therefor -- though --;

Column 4, line 28, delete "105°" and substitute therefor -- 150° --;

Column 5, line 62, after "film" insert ":";

Column 6, line 4, after "film" insert ":";

Column 6, line 11, after "70° C." insert ":"; and

Column 6, line 20, after "calendering" insert ":".

Signed and Sealed this

Eleventh Day of October, 1994

Attest:

BRUCE LEHMAN

Attesting Officer

Commissioner of Patents and Trademarks